US00RE42247E

(19) United States
(12) Reissued Patent
Veen

(10) Patent Number: US RE42,247 E
(45) Date of Reissued Patent: Mar. 29, 2011

(54) AUTOMATED FOOT BATH APPARATUS AND METHOD

(76) Inventor: Rick Vander Veen, Lyndan, WA (US)

(21) Appl. No.: 11/960,289

(22) Filed: Dec. 19, 2007

Related U.S. Patent Documents

Reissue of:
(64) Patent No.: 6,739,286
Issued: May 25, 2004
Appl. No.: 10/329,178
Filed: Dec. 23, 2002

U.S. Applications:
(62) Division of application No. 11/439,542, filed on May 23, 2006.
(60) Provisional application No. 60/343,806, filed on Dec. 26, 2001, and provisional application No. 60/358,438, filed on Feb. 19, 2002.

(51) Int. Cl.
*A01K 29/00* (2006.01)
*A61H 33/04* (2006.01)

(52) U.S. Cl. ..... 119/673; 4/541.6
(58) Field of Classification Search ..... 119/673, 119/14.01–14.03, 14.18; 4/451.6, 567, 574.1; 601/160; D24/204
See application file for complete search history.

(56) References Cited

U.S. PATENT DOCUMENTS 853,533 A 5/1907 Byrd
983,820 A * 2/1911 Goff ..... 119/668
2,956,565 A 10/1960 Anderson (Continued)

FOREIGN PATENT DOCUMENTS

EP 1099373 A 5/2001
GB 2311202 A 9/1997
GB 2398220 A 8/2004
JP 61-178860 11/1986
JP 62-202157 12/1987
NL 1009895 C1 2/2000
WO 9301763 A 2/1993

OTHER PUBLICATIONS

File History for related European Patent Application 028062206 as of Jan. 9, 2009, 196 pages.

Office Action issued in related U.S. Appl. No. 12/208,092, dated Feb. 6, 2009, 6 pages.

Response to Office Action issued in related U.S. Appl. No. 12/208,092, dated Apr. 14, 2009, 14 pages.

File History for related U.S. Appl. No. 11/439,542, dated May 23, 2006 through Sep. 26, 2008, 271 pages.

Partial File History for related Great Britain Application Serial No. 2398220 dated May 3, 2005 through Sep. 6, 2005, 29 pages.

Office Action issued in related Japanese Application Serial No. 2003557292 dated Dec. 15, 2008, 14 pages.

International Search Report issued in related PCT Patent Application Serial No. PCT/US02/41379, dated Sep. 9, 2003, 4 pages.

File History for related U.S. Appl. No. 11/960,420 through Dec. 15, 2008, 46 pages.

*Primary Examiner*—Thomas Price
(74) *Attorney, Agent, or Firm*—Lathrop & Gage LLP

(57) ABSTRACT

An automated cleaning system, where dairy cows pass through a foot bath region. The foot bath is periodically changed by implementing an agitation phase where high velocity water jets agitate the waste material in the foot bath and causes these to be discharged, followed by a drain phase where the liquid flows out an outlet. Then, a flushing phase removes the further debris, with the foot bath then being refilled with water and chemical disinfecting liquid for a subsequent cycle where another group of cows would pass through the foot bath region.

17 Claims, 5 Drawing Sheets

U.S. PATENT DOCUMENTS

| | | | | | |
|---|---|---|---|---|---|
| 2,989,965 | A | | 6/1961 | Rod | |
| 3,587,976 | A | | 6/1971 | Jacuzzi | |
| 3,691,995 | A | * | 9/1972 | Little | 119/702 |
| 3,792,686 | A | | 2/1974 | Needham et al. | |
| 3,828,733 | A | | 8/1974 | Correia | |
| 4,086,669 | A | | 5/1978 | Combis | |
| 4,183,329 | A | * | 1/1980 | Leonaggeo, Jr. | 119/651 |
| 4,197,815 | A | * | 4/1980 | Brazelton | 4/492 |
| 4,203,390 | A | * | 5/1980 | Brazelton | 119/702 |
| 4,228,554 | A | | 10/1980 | Tumminaro | |
| 4,291,646 | A | | 9/1981 | Leonaggeo, Jr. | |
| 4,316,433 | A | | 2/1982 | Hebert | |
| 4,317,431 | A | | 3/1982 | Sparkes | |
| 4,381,996 | A | | 5/1983 | Kugler et al. | |
| 4,513,735 | A | | 4/1985 | Friedson et al. | |
| 4,979,536 | A | | 12/1990 | Midkiff | |
| 5,195,455 | A | | 3/1993 | van der Lely et al. | |
| 5,224,224 | A | | 7/1993 | Hintz et al. | |
| 5,367,720 | A | | 11/1994 | Stephens et al. | |
| 5,588,161 | A | | 12/1996 | Barradas | |
| 5,630,379 | A | | 5/1997 | Gerk et al. | |
| 5,774,909 | A | | 7/1998 | Stable | |
| 6,134,722 | A | | 10/2000 | Lowry et al. | |
| 6,382,136 | B1 | | 5/2002 | Bragulla et al. | |
| 6,463,885 | B1 | | 10/2002 | Laner | |
| 6,739,286 | B2 | * | 5/2004 | Vander Veen | 119/673 |

* cited by examiner

AUTOMATED FOOT BATH APPARATUS AND METHOD

Matter enclosed in heavy brackets [ ] appears in the original patent but forms no part of this reissue specification; matter printed in italics indicates the additions made by reissue.

RELATED APPLICATIONS

*Notice: More than one reissue application has been filed for the reissue of U.S. Pat. No. 6,739,286; the reissue applications are application Ser. Nos. 11/960,289; 11/439,542; 11/960,420 (abandoned); and 12/208,092; all of which are divisional reissues of U.S. Pat. No. 6,739,286. The present reissue application is a divisional application of 11/439,542 filed May 23, 2006, the contents of which are incorporated herein by reference.*

This application claims priority benefit of the provisional applications U.S. Serial No. 60/343,806, filed Dec. 26, 2001, and U.S. Serial No. 60/358,438, filed Feb. 19, 2002.

BACKGROUND OF THE INVENTION a) Field of the Invention

The present invention relates to a foot bath for animals, such as dairy cows and more particularly to an automated foot bath apparatus and method which accomplishes not only the application of disinfectant to the hooves of the animals, but also accomplishes the cleaning and refilling of the liquid containing area of the foot bath.

b) Background Art

In a dairy parlor it is common to have the cows exiting the dairy parlor walk through a foot bath of approximately six feet by two and two-thirds feet and a depth of approximately six inches. This foot bath would have disinfectant that is dissolved in the water. The common prior art procedure is that there would be the area having a small pool which contains the water. The dairyman uses a hose to fill the pool with the water, and then pours the disinfectant chemical liquid and/or powder into the water and mixes these in the pool manually.

During the course of the cows moving through the foot bath, a certain amount of manure will commonly collect in the foot bath. After the milking operation is completed (i.e. all the cows have gone through for that particular milking period), then the dairyman will open the drain valve so that all the liquid flows out. Then the dairyman will hose the manure down the drain.

A search of the patent literature has disclosed a number of U.S. patents. These are as follows:

U.S. Pat. No. 5,774,909 (Stable) discloses a foot bath for the use in the treatment of cattle and other livestock. There is a resilient pad which is covered with a shallow layer of disinfectant fluid. As the cow steps on the pad, the fluid flows around the foot.

U.S. Pat. No. 5,630,379 (Gerk et al.) discloses what is called an "electrically controlled spraying device for cleaning and treating animals". There are rails around an enclosure and discharge nozzles mounted to spray a cleaning fluid or a treatment fluid under the animal, and it states that the device is able to clean the hooves of the animal.

U.S. Pat. No. 5,224,224 (Hintz et al.) discloses a foot bathing fixture that includes a seat supported on a raised pedestal. This is incorporated into a shower enclosure for a person.

U.S. Pat. No. 4,979,536 (Midkiff) discloses a portable a truck tire washing apparatus. There are two longitudinally-spaced tire rotating driveable roller trailer assemblies mounted on a support member and a liquid spraying means for spraying the tires.

U.S. Pat. No. 4,228,554 (Tumminaro) shows a toilet for animals particularly adapted for pets such as dogs and cats. There is a user platform on which the animal stands, and the platform has an upper surface which is gradually inclined down on shallow angle toward a center opening of the toilet. A flushing liquid is provided to flow over the surface to clean the waste material from the upper surface, and a bowl is located beneath the upper platform to receive the waste.

U.S. Pat. No. 2,989,965 (Rod) discloses a "foot wear decontaminating apparatus" for use in the atomic industry. The user steps on a platform immersed in a fluid, and a high frequency agitator washes off the contaminating material.

U.S. Pat. No. 2,956,565 (Anderson) discloses therapeutic equipment for remedial bathing and massaging treatment of feet and legs of animals. There is a container filled with granular solids such as soft, clean sand possibly 104 inches long, 42 inches wide and 18 inches high to contain the granular material. The racing horse, for example, is brought to stand with all feet in the soft wet bed and is permitted to sink to a depth somewhere between the ankle and knee height. Heat that could be applied to alleviate the soreness of the animal.

U.S. Pat. No. 853,533 (Byrd) shows a foot bath intended to be occupied by horses as they drink from the attached water trough. There is a drain to keep the water at the desired depth.

SUMMARY OF THE INVENTION

The present invention relates to a system, apparatus, and method which can be automated, in whole and in part, as a foot bath system for animals. The present invention is particularly adapted for use in a dairy parlor where a smaller or much larger number of cows pass through a foot bath after the completion of a milking operation. Within the broader scope of the present invention, this invention could be used for other animals, particularly animals having similar situations or needs as milk cows.

In the system of the present invention, there is a foot bath structure having a front wall, a rear wall, two side walls, and a floor. The foot bath structure defines a liquid containing region comprising a front containing area and a rear containing area. This foot bath structure is arranged to permit the animals to walk over the floor and through the foot bath in the liquid containing region.

The system further comprises a water inlet section arranged to supply liquid to said liquid containing region, and to supply at least a portion of the water so as to be directed into the front water containing area as high velocity jet flow to be able to cause a flow pattern in the liquid containing region of any current flow, turbulent flow, or a combination of any current flow and turbulent flow. This is able to accomplish the moving of waste material in the liquid containing region.

There is a discharge section which is at the rear containing area and which has a closed configuration in the liquid containing region, and an open configuration to discharge liquid in the liquid containing region.

A chemical supply section is provided to provide a quantity of chemical components as an ingredient in a foot bath liquid for the liquid containing region.

A control section is arranged:

i) to cause the water inlet section to operate in a time frame to supply water to the liquid containing region to cause said high velocity jet flow pattern, thus to move waste material in the liquid containing region, and also to provide water as a constituent for the foot bath water in said liquid;

ii) to cause said discharge section to selectively move between the closed and open configuration to contain liquid or permit an outflow of liquid in the liquid containing region; and iii) to cause said chemical supply section to provide said quantity of the chemical component for the foot bath liquid.

In the preferred embodiment, the control section is arranged to operate in a cycle of operation through at least an agitation phase where the water inlet supplies water as a high velocity jet flow to move waste material in the liquid containing region, and for at least part of time that the high velocity jet flow takes place, the discharge section is caused to be in its open configuration to enable liquid in the liquid containing region with waste material carried thereon to be discharged from the liquid containing region.

More specifically, there is in the cycle, a draining phase, where the flow of high velocity of liquid jet water is at least reduced or stopped, and the outlet section is in its open configuration, followed by the flushing phase where the liquid outlet section is in its open configuration, and the water inlet section is discharging water with high velocity jet flow to cause removal of waste material from the liquid containing region. Then, there is a filling phase that can be combined with the chemical injection for a filling and chemical injection phase.

The chemical component is injected in the preferred form as a chemical liquid into the water that is provided for the liquid containing region. In a preferred form this is directed into the water along with the high velocity jet flow taking place.

In preferred form, there are at least first and second water inlet openings spaced laterally from one another to direct water at the high velocity flow. The foot bath structure is arranged so that the liquid containing region has a front to rear longitudinal axis and a transverse axis, and the liquid containing region has a length dimension along the longitudinal axis greater than a width along the transverse axis. The two inlet openings of the water section are positioned at the front wall of the foot bath structure, facing generally in a rearward direction toward the rear wall, and being spaced laterally from one another on opposite sides of the longitudinal center axis. Thus, the two inlet openings cause water streams to travel on opposite sides of the longitudinal axis and have a return flow path in an eddy current flow in a forward direction at a location closer to the longitudinal center axis.

The water inlet section has a third liquid inlet that is positioned between the first and second liquid inlets, and nearer to the longitudinal center axis. The third inlet opening directs a third flow of water in a generally longitudinally aligned direction.

More specifically, the third inlet opening has a generally laterally aligned slot-like configuration to discharge water in a laterally expanding pattern toward the flow streams generated by the first and second high velocity jet flows from the first and second jet openings.

In another embodiment, there may be two additional inlet openings of the water inlet section which discharge water at a high velocity jet flow mode into the liquid containing region.

In a preferred form, the first and second inlet openings are spaced from the longitudinally center axis of the foot bath at least a quarter of a distance between the longitudinal center axis and an adjacent outer end portion of the front wall, and in a more preferred embodiment at least approximately the adjacent outer edge of the front wall.

The high velocity flow of the two jets forming the high velocity liquid jet flow, is at least two feet per second, and could range in values from 3, 4, 5, 6, 7, 8, 9, 10, 11, 12, 13, 14 or 15 feet per second.

The control system comprises a clock component having operative connections to at least three components or combination of components, and in turn provide timing for the activation of the water inlet section, the discharge section, and the chemical supply section to cause these to operate.

As an alternative, the control section could comprise a micro-computer to control the operation of the water inlet section. The computer could be programmed so as to cause various phase or phases of the cycle of the system to occur at different times, such as for example, causing an agitating and flushing action between the cycles.

The present invention also comprises a method, and the steps of this method are readily understood from reviewing the above-noted description of the operation of the system. Further, the present invention comprises the apparatus utilized in the system and particularly adapted for use in this invention. Other features will become apparent from the following detailed description.

DETAILED DESCRIPTION OF THE PREFERRED EMBODIMENTS

The present invention is particularly adapted for use in a milking parlor where the cows which have just been milked walk through a foot bath containing disinfectant and possibly other ingredients, and in the following description, the apparatus and method of the present invention will be described in the context of use in a dairy parlor. However, within the broader scope of the present invention, it may be possible to use the apparatus and method of the present invention in situations where a similar cleaning/disinfecting operation must be performed on the hooves or lower extremities of some other type of animal.

Figure 1:
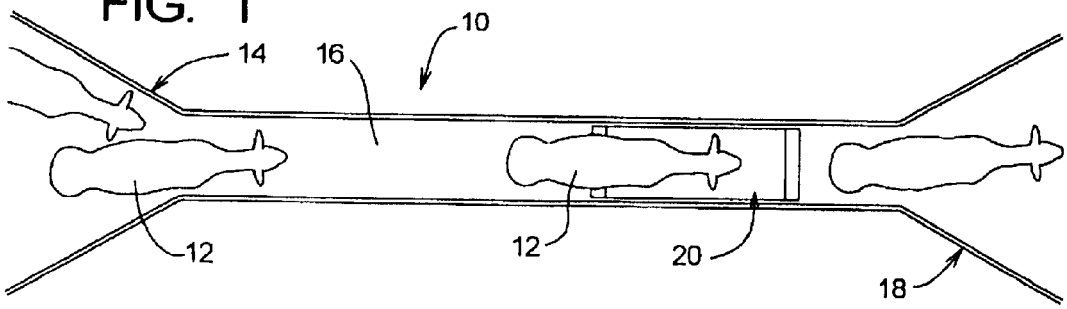
FIG. 1 is a top plan view illustrating the cows moving from the milking parlor through a pathway in which the apparatus of the present invention is located, and outwardly therefrom.

Reference is first made to FIG. 1 which shows schematically a top plan view of an exit portion 10 of a milking parlor where the cows 12 are led into an inlet area 14 and move along a pathway 16 to the outlet 18. Normally, the pathway 16 would be confined in some manner, such as having a wall on one side (e.g., four to five feet high), and possibly piping or other items or structure on the opposite side.

Figure 2:
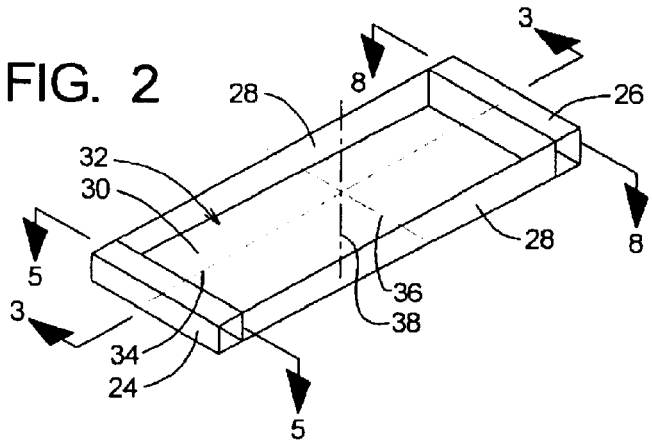
FIG. 2 is an isometric view of the foot bath structure used in the system of the present invention.
Figure 3:
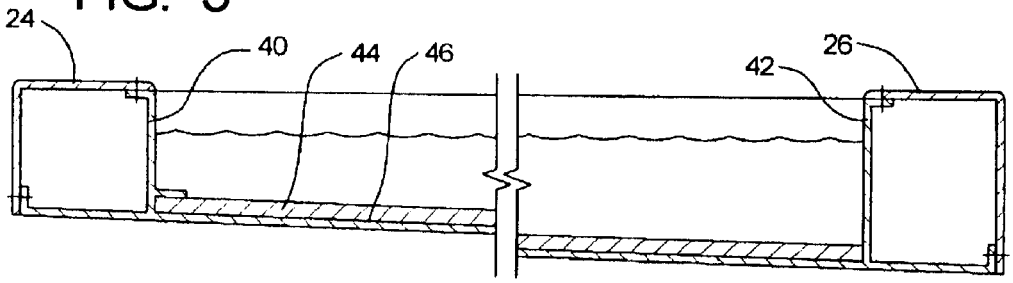
FIG. 3 is a longitudinal sectional view taken along line 3—3 of FIG. 2.

Positioned in the pathway 16 is the apparatus 20 of the present invention. The apparatus 20 comprises a foot bath structure 22 that comprises a front wall 24, a rear wall 26, two side walls 28, and a floor 30. The foot bath structure 22 is a rigid structure and can be made, for example, of stainless steel. In FIGS. 2 and 3, the foot bath structure 22 is shown separately from other components of the apparatus for purposes of illustration. The inside surfaces of the four walls 24–28 define the perimeter of a liquid containing region 32 to contain the foot bath liquid which would normally comprise water having disinfectant chemicals dissolved therein.

To facilitate the description of the apparatus of the present invention, the foot bath structure 22 can be considered as having a longitudinal center axis 34, a transverse axis 36, and a vertical axis 38.

As can be seen in FIG. 3, the floor 30 has a moderate downward slope from the front wall 24 to the rear wall 26, which could be, for example, about a change of two inches in elevation from the location of the front wall 24 to the rear wall 26. Overall, the vertical dimension of the inner surface 40 of the front wall 24 may be about six inches, while the inner surface 42 of the rear wall 26 could be eight inches. Typically, the inside dimensions of this liquid containing region 32 would be such that the lengthwise dimension is about twice the width dimension, with, for example, the lengthwise dimension being about six to six and a half feet in length, and the width about thirty-two to thirty-four inches in width.

There is a rubber mat 44 positioned on the upper surface 46 of the floor 30. This mat 44 prevents the cows from slipping, and also provides a certain amount of comfort so that the cows are not walking over a metal surface.

It can be seen that both the front wall 24 and the rear wall 26 each have a cross-sectional configuration of a rectangle, this being done so that these can contain certain components which are described later herein. At the forward end of the foot bath structure 22 there is a liquid inlet section 48, which in turn is made up of a water inlet section 50 and a chemical liquid section 52 (the term "chemical liquid" refers to the liquid that contains the disinfectant chemicals and possibly other chemical additives to accomplish various functions, and these are simply referred to as "liquid chemical" or "the chemicals").

At the rear end of the foot bath structure 22 (see FIGS. 7–9) there is the outlet section 54 at which the liquid in the liquid containing region 32, along with any waste material in the region 32, is discharged from the liquid containing region 32. This outlet section comprises a discharge valve section 56 which will be described in greater detail later herein. As used herein, the term "waste material" shall include the manure and other material that should desirably be removed from the foot bath structure.

Figure 5:
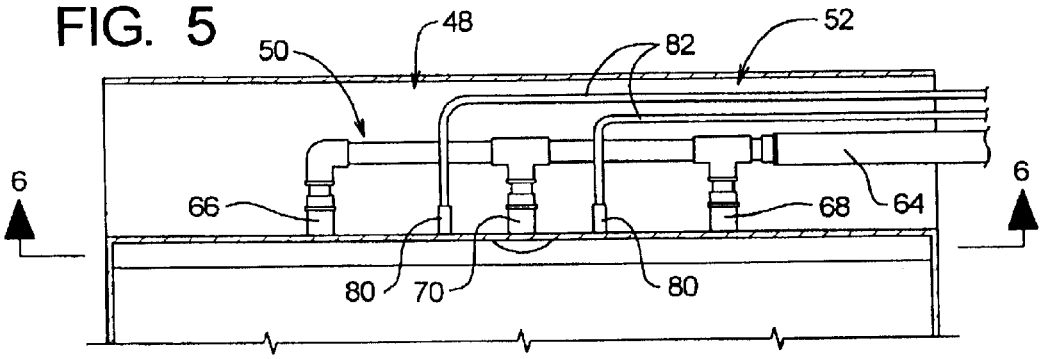
FIG. 5 is a plan view of the front portion of the foot bath structure with the cover of the front wall removed, and showing portions of the water inlet system and the liquid chemical inlet system.
Figure 6:
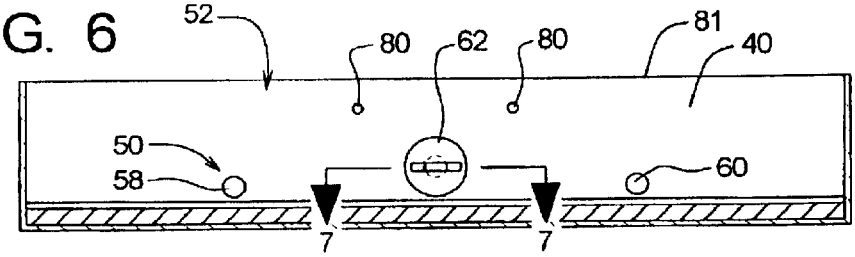
FIG. 6 is a transverse sectional view taken along line 6—6 of FIG. 5.

To describe now the water inlet section 50, reference is made to FIGS. 5 and 6. FIG. 6 is an elevational view looking horizontally at the inner surface 40 of the front wall 24. There are shown three water inlet openings, namely two side openings 58 and 60, and a center opening 62. Water is supplied to these openings 58–62 through a main pipe 64 which leads into three branch outlet pipes 66, 68, and 70 which supply water to, respectively, the [outlet] *inlet* openings 58, 60, and 62. The side openings 58 and 60, each have a circular cross-sectional configuration which in this preferred embodiment have an inside diameter of one-half inch. Likewise, the two feed pipes 66 and 68 also have a one-half inch inside diameter, and these openings 58 and 60 can be considered as extensions of these pipes 66 and 68.

Figure 7:
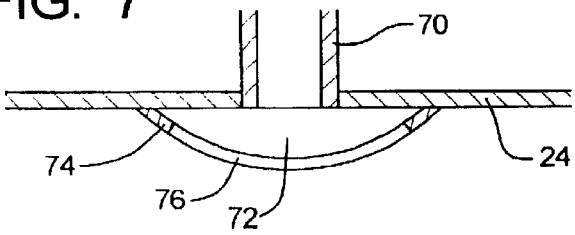
FIG. 7 is a sectional view taken along line 7—7 of the middle water outlet.

The inlet opening [70] *62* has a somewhat different configuration, and this can better be seen by viewing FIG. 7. The branch pipe 70 leads into a small chamber 72 which is defined by a small dome-shaped cover 74 which is formed in a spherical curve. This cover 74 is formed with a horizontal slot 76 which in this particular embodiment has a length of about two inches and a width dimension of about one-sixteenth inch. With the domelike cover 74 being curved in the configuration of a spherical curve, the slot opening 76 curves in a circular arc of about two-thirds of a right angle. Thus, the liquid that is discharged from the slot opening 76 is in a fan-like configuration, and is, with respect to its vertical dimension, rather thin, and in a horizontal direction expands laterally and outwardly. With the three openings 58–62 being fed from a single pipe 64, the water which is directed into the line 64 flows through a single control valve indicated schematically at 78 in [FIG. 6] *FIG. 4*.

The spacing of the inlet openings 58–62 is that each side opening 58/60 is located about half-way between the center of the center opening 62 and the adjacent side wall 28, but the openings 58/60 could be closer to the side walls 28.

The aforementioned chemical liquid section comprises two liquid chemical inlet openings 80 which are positioned a short distance below an upper edge 81 of the front wall 40. Each opening 80 is fed by a respective pipe 82, these two pipes 82 being shown in FIG. 5.

Figure 4:
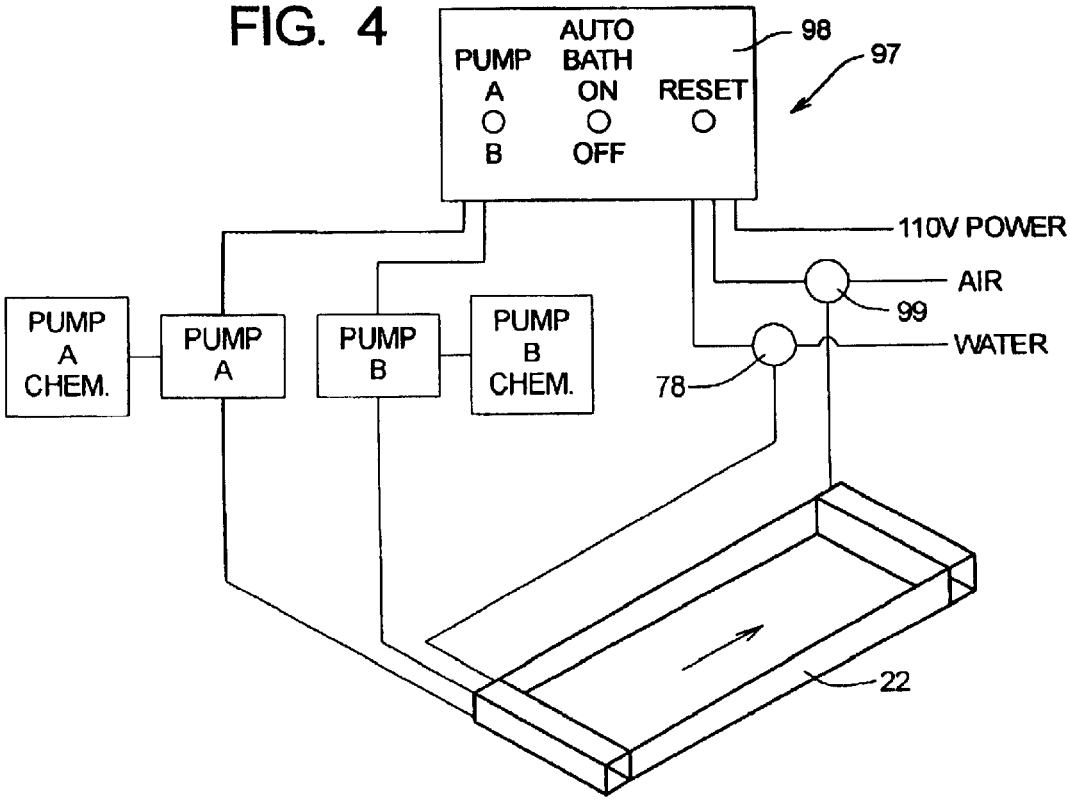
FIG. 4 is a view illustrating isometrically the foot bath structure, and also illustrating schematically a simplified representation of the control and pumping system of the present invention.

Each pipe 82 is connected to a respective liquid chemical pump which are shown in FIG. 4 as pump A and pump B, each of which draws its chemicals from a respective chemical source Chem A and Chem B (also shown in FIG. 4) by selectively operating one or the other of pump A and pump B, the desired chemical Chem A and Chem B can be injected into the liquid containing region.

The reason for this is that it may be desirable to use one type of chemical when the cows are directed through the foot bath apparatus 20 one day of the week, and a different chemical used when the foot bath apparatus 20 is used on another day of the week.

Figure 8:
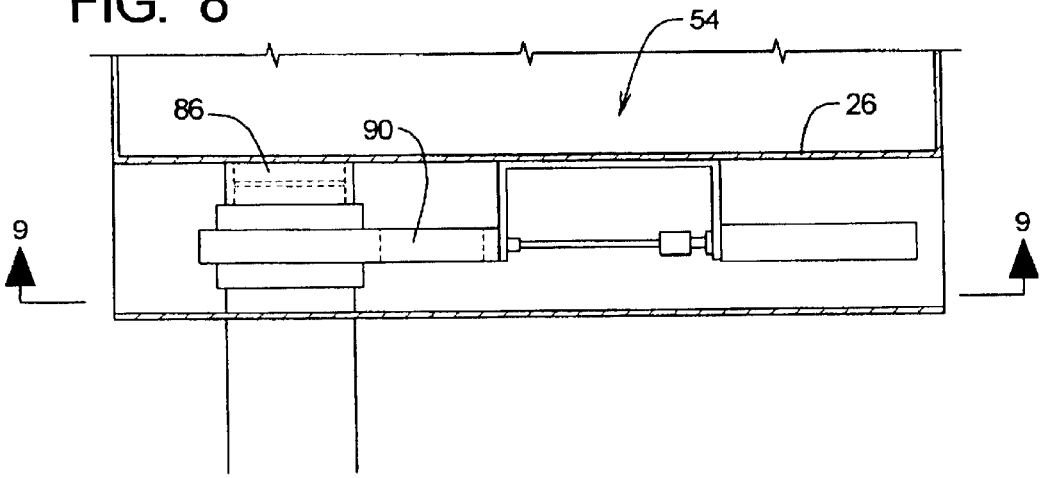
FIG. 8 is a top plan view of a rear end portion of the bath structure with the cover removed, and showing the outlet valve system.
Figure 9:
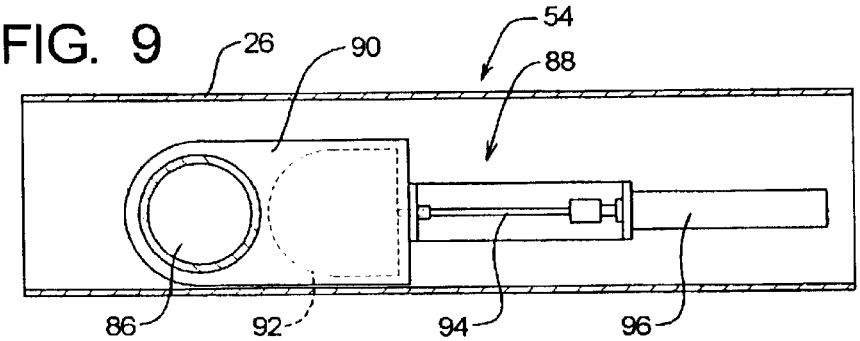
FIG. 9 is a transverse sectional view taken along line 9—9 of FIG. 8.

Reference is now made to FIGS. 8 and 9 to describe the discharge section 54. The discharge section 54 comprises a discharge opening 86 formed in the inner wall portion of the rear wall 26. In this particular embodiment, this opening 86 is formed as a circular opening having an inside diameter of about four inches.

There is positioned in the interior of the structure of the rear wall 26 a discharge valve 88. The valve 88 comprises a valve housing 90 which in turn has a valve element 92 which is mounted for reciprocating motion in the housing 92, and which in FIG. 9 is in its retracted open position. During the operation of the system, the valve element 92 is normally in its closed position (i.e., urged toward its closed configuration). When the valve 88 is actuated, the valve element 92 is retracted to the position of FIG. 9 by a rod 94 which is powered by an air cylinder 96. As shown herein, the discharge opening 86 is located on the left side of the rear wall 26, and this is done primarily in this particular embodiment to accommodate the components of the valve 88. This discharge opening 86 could be in different locations on the rear wall 26. Alternatively, there could be more than one discharge opening 86 at different locations on the rear wall 26.

The basic operating system is designated 97 and is shown somewhat schematically in FIG. 4. There is a control box 98 which is shown in more detail in FIG. 10 and which will be described in more detail later in this text. The control box connects to the aforementioned pumps A and B which are (as indicated above) connected to the two chemical sources Chem A and Chem B. to selectively direct the liquid chemicals from either Chem A or Chem B.

The control box also has an operative connection to the valve 78 which is connected to a water supply to selectively direct the water to the pipes 66, 68, and 67, which in turn are connected to the three inlet openings 58, 60, and 62, respectively. Further, the control box 98 has an operative connection to a solenoid valve 99 that is connected to an air supply source and selectively directs the air (e.g., at 40–80 psi) through one of the other of two air hoses to operate the aforementioned pneumatic cylinder 96.

To describe the method of the present invention, let us first review generally the usual dairy operation. The cows are milked twice daily, seven days a week, but chemical foot baths may be used possibly only three days a week, and we will assume that these three days are Monday, Wednesday, and Friday, and that the chemical baths would be used in the afternoon milking which would begin, for example, at 4:00 p.m.

After approximately 150–200 cows have walked through the foot bath, the disinfectant liquid in the foot bath would be in condition where it should be replaced by fresh water with fresh disinfectant chemicals therein. Let us assume for the moment that there are 600 cows being milked, and that in a one-hour period on the average 150 cows would have passed through the foot bath, and at the end of that hour, the disinfecting water supply in the liquid containing region would have to be flushed out and a fresh batch of water with the disinfectant is fed into the liquid containing region 32. This would mean that there would be four cycles of replenishing the disinfecting liquid water in the liquid containing region 32.

We will first take the situation where the liquid containing area 32 is already filled with water having the disinfectant therein, and enough cows have just passed through the foot bath (e.g., one hundred and fifty) so that it is time to remove the water and the waste material contained therein to start another cycle for the next 150 cows, after which yet another cycle must start for the third group of 150 cows which are to be directed through the foot bath.

In this situation, one complete cycle is made up of four operation periods or phases. These are as follows:

i. Agitation phase;

ii. Draining phase;

iii. Flushing phase; and iv. Water-fill and chemical injection phase.

Each of these operation phases will now be described in order.

a) The Agitating Phase

To begin the agitating phase, the water valve 78 is opened to cause the water to flow through the three inlet openings 58, 60, and 62, and at the same time (or very shortly thereafter) the valve 88 is operated to open the discharge opening 86. The system is arranged so that the two side inlet openings 58 and 60 discharge water at a greater volumetric rate, and also at a higher discharge velocity than the middle inlet opening [72] *62*. The calculated values for the volume of water discharged from the two side openings 58 and 60 is a total of about twelve gallons per minute and at a pressure of about 30 psi, the calculated exit velocity is a little less than eight feet per second. Then, the water flow from each of the openings 58 and 60 is in the form of a high velocity water jet capable of forming active eddy currents and some turbulence in the liquid in the liquid containing region 32.

The flow of water through the central nozzle 68 has a calculated value of about 2.6 gallons per minute at 30 psi, and the exit velocity was calculated to about 3.3 feet per second. This forms the aforementioned fan-shaped water jet of somewhat lesser strength.

The effect of the placement of the inlet openings 58–62 and the flow volume and velocities are such that the outside openings 58 and 60, in conjunction with the middle opening 62, create an eddy current pattern in the foot bath. These eddy currents add to the agitation in the entire liquid containing region 32 and facilitate the cleaning of the surface of the floor 30, as well as the inner surfaces of the walls 24–28.

The effect of these eddy currents flowing in the region 32 is that the waste material (i.e., the manure and possibly any other debris, such as mud, which may be in the liquid containing region 32), is agitated and circulated in the liquid containing region 32, reducing waste material to smaller particle size, and causing the material to be suspended in the water. With the water openings 58–62 being located directly above, and very close to, the rubber mat 44 and facing in a rearward direction, and with the water flow being closely adjacent to the upper surface of the rubber mat 44 the cleaning effect is enhanced.

Figure 13:
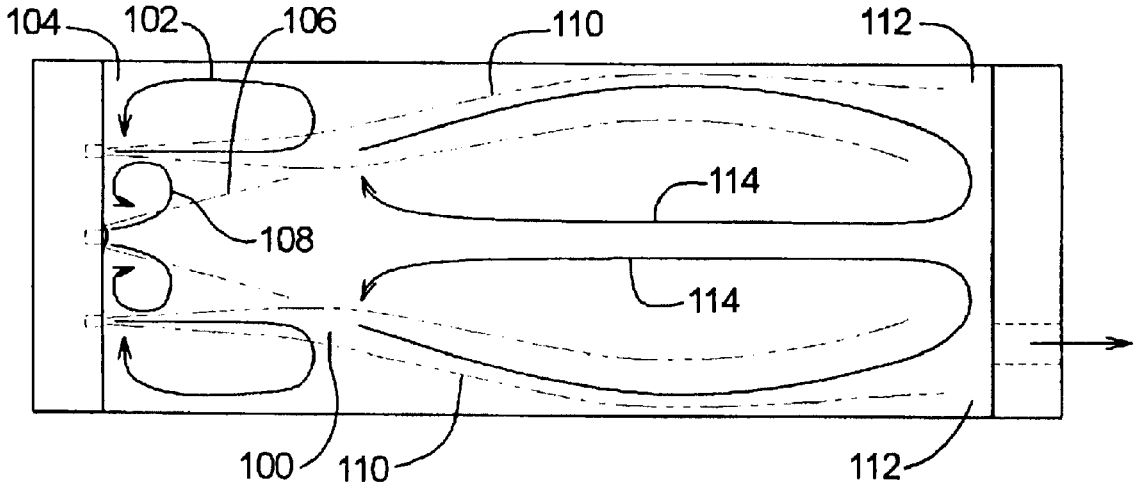
FIG. 13 is a top plan view of the foot bath structure showing the pattern of eddy currents which are generated in the first embodiment.

To disclose the pattern of the eddy currents in more detail, reference is made to FIG. 13, which is a plan view of the foot bath structure 22. The two primary initial flow paths are the two streams of water indicated at 100 which are emitted from the two inlet openings 58 and 60. These two streams 100 produce two smaller eddy currents 102 that sweep the front corner regions 104. At the same time, the fan-shaped discharge of water 106 from the center inlet opening 62 creates two yet smaller eddy currents 108 at the front wall and adjacent to the primary flow streams 100.

As the flow streams 100 travel further downstream (i.e., toward the rear wall 26), these two streams 100 spread laterally as indicated at 110. Present analysis indicates that this is due, at least in part, to the effect of the spreading fan-shaped flow stream 106 from the outlet 62. As these two stream portions 110 move further rearwardly, they reach the rear corner areas 112 and are redirected inwardly and laterally toward a longitudinal center location and result in eddy current flow paths 114 traveling toward the forward wall 24. In the particular prototype of this apparatus which was constructed, it has been observed that these flow paths 114 travel upwardly approximately two-thirds to three-quarters of the distance from the rear wall to the front wall.

With these eddy current patterns being established, the agitating action continues through the time span of the agitating phase. In the preferred embodiment disclosed herein, it has been found that a period of about fifty to sixty seconds is satisfactory, but the time span of the agitating phase can be varied. During the agitation phase, as the water continues to flow in through the three inlet openings 58–62, water is also passing out the discharge opening 86, so there is a net downstream flow of liquid toward the rear of the liquid containing region 32.

During the agitating phase, a substantial portion of the manure and other debris (e.g., eighty percent) passes out the discharge opening 86.

b) The Draining Phase

The draining phase is initiated by keeping the discharge opening 86 open and closing off the flow through the three inlet 58–62. This results in a downhill flow following the slant of the floor 30 toward the discharge opening 86. After most all of the liquid in the liquid containing region 82 has passed out the discharge opening 86, the flushing phase begins. The time period of the draining phase can be approximately one-half to three-quarters of a minute, but this can be varied.

c) The Flushing Phase

The flushing phase is accomplished by leaving the discharge opening 86 open and then starting the water flow through the inlet openings 58–62. During the initial part of the flushing phase and for some time thereafter, the velocity of the water moving toward the rear wall 26 is at a high level, and the remainder of the waste material is flushed down to the discharge opening 86. The average time period of the flushing phase can be about one-half of a minute to three-quarters of a minute, but this also can be varied.

d) Water-fill and Chemical Injection Phase

To initiate this phase, the discharge opening 86 is closed and fresh water continues to be discharged from the three openings 58–62 into the liquid containing region 32, and this continues for the length of time sufficient to fill the region 32 to the proper liquid level. A short time after the discharge opening 86 is closed (e.g., about twenty seconds) the flow of chemical liquid is initiated by discharging the chemical liquid from the openings 80 into the water that flows into the liquid containing region 32. Since the water being fed into the region 32 has essentially the same circulating pattern as described above with regard to the agitation phase, the chemical liquid becomes well-mixed in the water.

As a possible alternative (or in addition to injecting the chemical liquid into the liquid containing region 32), the addition of the liquid chemicals could be done manually, and the chemicals could be added in powder form to dissolve it into the water.

Let us assume now that after the last cycle which is to be performed on that particular day has been accomplished, and that the last group of 150 cows have passed through the foot bath. At that time, the system is caused to automatically shut down, and the power to the solenoid valve 99 would be shut off. This would cause the pneumatic cylinder 96 to retract so that the discharge opening 86 would remain open. Thus, the urine that may be discharged from the cow into the liquid containing region would flow out the drain valve 86. Further, If the area is being manually hosed down with water, water could be directed into the bath containing structure 22 and wash any collected manure and/or debris out the discharge opening 86 to a drain.

Now, let us assume that the cycle which is to be started is the first cycle in a series, which for example, with there being four cycles in this series to accommodate 600 cows. In this situation, the same steps are performed as indicated above. However, since the discharge opening 86 has remained open, at the beginning of the agitation phase, the water that flows through the three inlet openings 58–62 flows into the liquid containing region without having the disinfectant liquid from the last cycle in the region 32. Thus, the fresh water during this agitation phase would be flowing into the region 32 at a relatively high velocity and would serve the same function of dislodging the manure and other debris, and reducing it in particle size so that it is discharged through the discharge opening 86. Then, the complete cycle continues as described above.

Let us now consider the situation where possibly there are only 150–200 cows to be milked and there would be no water fill and chemical injection phase at the end of the cycle. Rather, the system would be shut down at the completion of the flushing cycle, and (as indicated previously) the discharge opening 86 would remain open.

Obviously, the various numerical values, dimensions, and design parameters which are noted above can vary, depending upon various circumstances. For example, while the two inlet openings 58 and 60 are in this preferred embodiment one-half inch in inside diameter (0.5 inch), the inlet openings 58 and 60 could be 0.55 inch, 0.6 inch, 0.65 inch, and upwardly in 0.05 inch increments up to possibly as great as one inch or greater. Also, the inlet openings of 58 and 60 could be made smaller such as 0.45 inch, 0.4 inch, and downwardly by 0.05 inch increments up to possibly as small as 0.25 inch or lower. Various factors could influence this, such as the velocity of the water, the number of inlet openings, etc.

Further, the dimensions of the central slot opening 22 could be made greater or less in the length dimensions by increments of 0.05 inch from 2.05 inch up to three or four inches, or at a lesser length of 1.95 inch, 1.9 inch, and so forth down to possibly 1.0 inch or smaller. In like manner, the width dimension could be varied by 5% or 10% increments to two or three times the width dimension of one-sixteenth inch. It could also be reduced by these same percentage increments.

Further, while the preferred velocities have been given as about 7.75 ft./sec. (for the inlet openings 58 and 60) and 3.3 ft./sec. for the (i.e. central opening 62) these can be varied by 0.5 ft./sec. increments upwardly or downwardly so that the velocity of the side inlet openings 58 and 60 could be up as high as 15 ft./sec. or as low as 4 ft./sec. or conceivable 3 or 2 ft./sec, or any of these values in-between that are given in 0.5 ft./sec. increments, such as 5, 6, 7, 8, 9, 10, 11, 12, 13, 14 or 15 ft./sec. or higher.

Also, the number of the inlet openings 58 and 60 could be varied and also the placement of the same. For example, each inlet openings 58 and 60 can be substituted by two or three inlet openings each, and the same could be done for the central opening 62. Also, it could be that a pair of outside inlet openings could be placed more closely adjacent to the sidewalls 12, or more toward the longitudinal center line.

Another possibility is that one or more additional openings could be positioned on the sidewalls, possibly to create a stronger flow pattern closer to the sidewall or influence on/off switch and turbulence in some manner.

Also, it should be pointed out that the arrangement of the inlet openings 58–62 have certain advantages in being positioned at one end of the foot bath structure 22. In many milking parlors, the path along which the cows move in leaving the dairy parlor is often limited in its width dimension, and there may be a wall on one side and either another wall or various structures, such as pipes, etc., on the other side, and thus it is more difficult to place certain components. However, in some instances, it may be practical (and possibly advantageous) to modify the pattern of jets so that one or more water inlets could be placed along the side walls 28. For example, as indicated above, the added jets could be used to direct additional water jets in a pattern to enhance the current pattern, or be used in some other way to create a turbulent pattern in addition to the eddy current pattern described.

Figure 10:
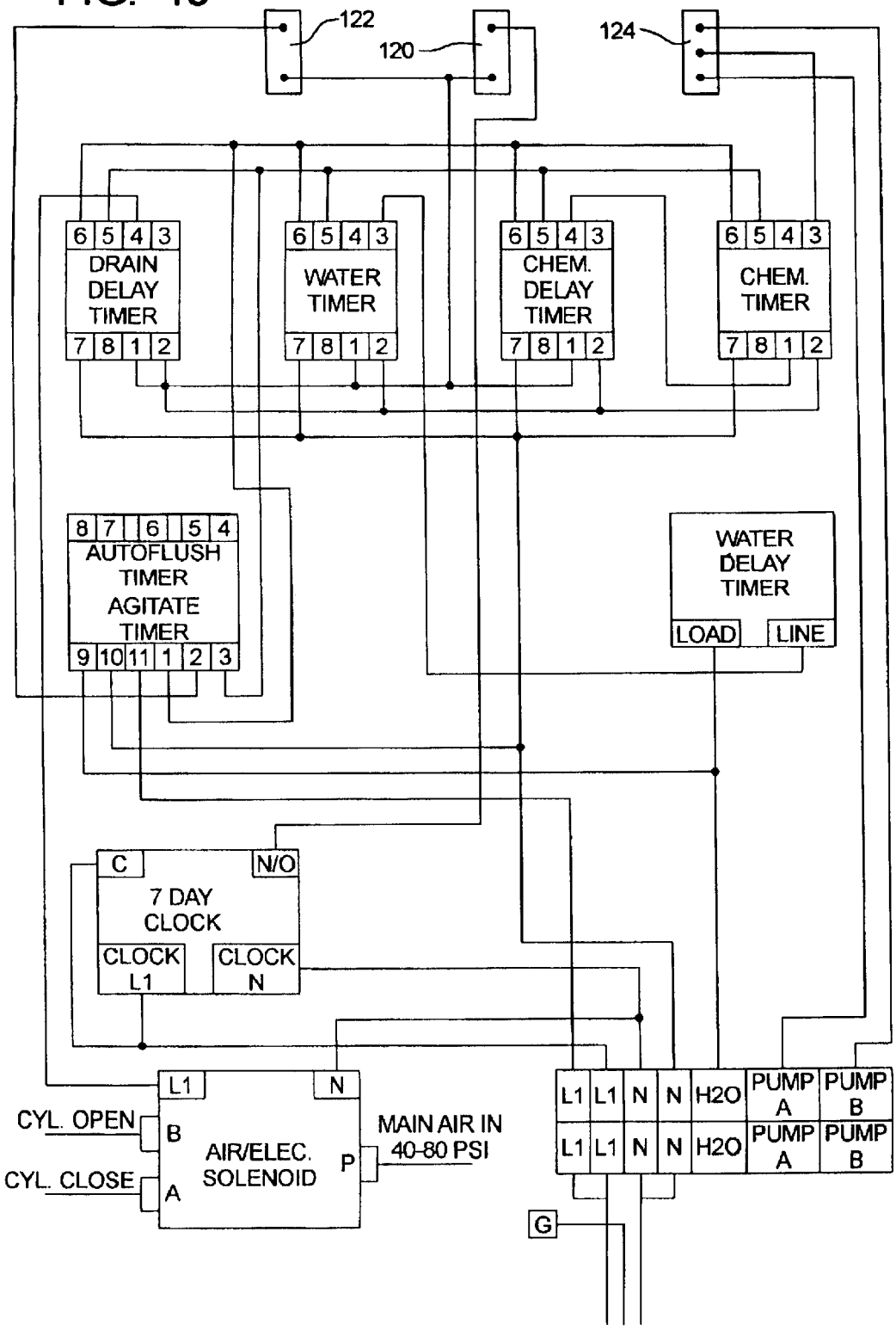
FIG. 10 is a schematic view of the control system of the present invention.

FIG. 10 shows the operating system of the present invention. In this system there are six timing devices. First, there is the auto flush/agitate timer, and this timer activates the other five timers, namely, the drain delay timer, the water timer, the chemical delay timer, the chemical timer, and the water delay timer. Thus, when this auto flush/agitate timer is activated, it initiates an entire single cycle.

There is a seven-day clock which is set to initiate a cycle or a series of cycles on certain days of the week and at a selected time or times of the day. For example, as was done earlier in this text, let us assume that the dairy farm has 600 cows. Thus, if there is one cycle for every 150 cows, there would be four consecutive cycles for each day that the foot bath apparatus is used. Let us further assume, for example, that the foot bath apparatus 20 is to be operated three days a week, such as Monday, Wednesday, and Friday, with the cycles beginning at 4:00 p.m. at the start of the second milking. This seven-day clock would then start the set of four cycles at 4:00 p.m., three times a week, at timed intervals (e.g., about one hour apart) so that on the average about 150 cows would have passed through the foot bath before the next cycle begins.

At the lower right-hand corner of the drawing is a terminal strip which supplies power to the various components. At the lower left-hand side of the drawing, there is a solenoid for the drain valve.

At the top center part of the drawing, there is the main on/off switch 120 which controls the overall operation. To the left of the on/off switch 120, there is a manual override switch 122 which when closed will initiate a single cycle. At the upper right-hand portion of FIG. 10, there is the liquid chemical switch 124 that energizes the desired chemical pump to direct the desired liquid chemicals into the liquid contained region.

In operation, when the auto flush/agitate timer is activated, this will immediately cause the drain delay timer and the water timer to be activated to start the flow of water through the three water inlets 58–62, and at the same time energize the drain delay timer to energize the solenoid to open the discharge valve 88. This initiates the agitating phase portion. At the end of the time period for the agitating portion of the cycle, the water delay timer operates to suspend the operation of the water timer so that the water valve to the three water openings 58–62 closes for the drain period.

After the drain period, the water delay timer functions to enable the water timer to again become operative to open the water valve 78 to cause the water to flow into the foot bath for about half-minute to accomplish the flush phase. During this half-minute of the flush phase, the drain delay timer is still holding the outlet valve in its open position. At the end of the flush phase, the drain delay timer causes the outlet valve 88 to close, so that the water fill and chemical injection phase can take place. During this time, the water timer keeps the main water valve open for the duration of the water fill. Also, during this water fill portion of the overall cycle, the chemical timer is activated to cause the flow of the liquid chemicals into the foot bath. After there is adequate flow of the chemicals into the foot bath, the chemical delay timer shuts off the flow of the liquid chemicals.

When the water fill/chemical injection phase of the cycle is completed, and also with the inflow of the liquid chemicals completed, the overall cycle has ended. On the assumption that the seven-day clock is set to initiate a subsequent cycle in the set of cycles, then this will be caused to occur in the selected time period (e.g., one hour) for the next cycle to start.

It is to be understood that once the switch is turned on to start the cycle, the four phases of the cycle described immediately above take place automatically. Further, with the control apparatus with its timing sequences established for starting the next automatic cycle, there is no need for any human action to start the next cycle.

As indicated above, one of the benefits of this invention is environment-related in that it keeps the dairyman or farmer further away from this area. Also, the water inlet openings 58–62 serve several functions. First, during the agitation phase as the water flows through the water inlets (water jets) 58–62 into the region 62, there are eddy currents and other turbulence. As described above, this causes the manure and other debris to be loosened from the liquid containing region and also be broken into smaller particles and caused to be suspended in the liquid so that the liquid containing region is properly cleaned, with much of this waste material passing out the discharge opening. Second, they serve the function of providing the water during the flushing phase to flow at a sufficiently high velocity to wash the remaining manure. Third, the water inlets 58–62 have the function of filling the liquid containing region 32 with water. Fourth, during the period when the chemicals are being injected into the foot bath, the flow of the water with its turbulence and eddy currents properly mixes the chemical solution.

Further, a significant benefit of the present invention arises from the following situation. Usually, after about 150 to 200 cows have walked through the foot bath, the disinfectant solution becomes much less effective. As a practical matter, if the dairyman has a herd substantially larger than 150 to 200 cows, the dairyman will quite often not take the time to change the water and disinfectant in the foot bath for the cows that are entering the foot bath beyond the original 150 to 200. The benefit of the present invention is that with the system being automatic, the following cycle after 150 or possibly 200 cows have passed through takes place automatically. If for some reason the automatic portion of the system is not operative, the operation for the next 150 cows could be very easily initiated by pressing the start button and causing the system to go through its next cycle.

Figure 11:
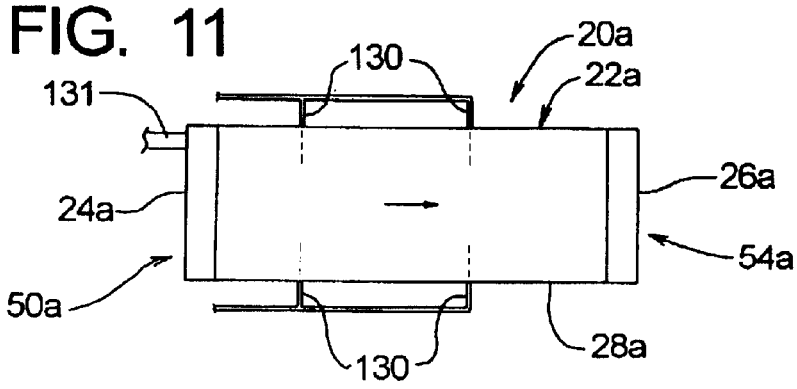
FIG. 11 is a top plan view showing a second embodiment of the present invention where there are additional inlet openings positioned at the side walls of the foot bath structure.

A second embodiment of the present invention is shown somewhat schematically in FIG. 11. Components of the second embodiment which are the same as, or similar to, components of the first embodiment, will be given like numerical designations, with a "a" suffix distinguishing those of the second embodiment.

The apparatus 20a comprises the foot bath structure 22a which is the same as, or similar to, the bath structure 22 of the first embodiment, and there are the same arrangements of the water inlet section 50a and the outlet section 54a. There are the inlet openings which are (or may be) the same as or similar to those of the first embodiment.

This second embodiment differs in that there are additional inlet openings 130 that are positioned at the side walls 28a. These inlet openings 130 could be directed in a downstream direction to enhance (or effect in some other way) the flow paths 110 of the eddy currents, as shown in the first embodiment. Or, they could be directed in a manner to have a more transverse component of travel. Further, it could be arranged so that these additional water inlet openings 130 could be arranged to emit their water jets periodically, and this could be done for various reasons, such as modifying the flow temporarily for improved dislodging of the waste material or other reasons. Also, there is shown an additional water inlet opening 131 which could direct water into the region 32 at a lower velocity during the fill phase.

Figure 12:
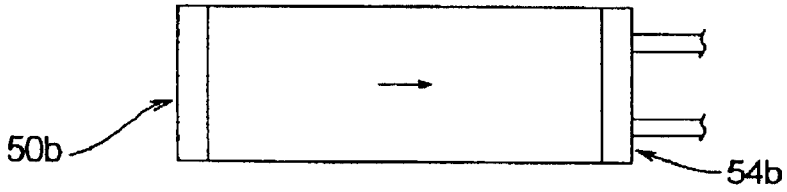
FIG. 12 shows a third embodiment where there are two selectively operated discharge outlets at the liquid outlet section.

A third embodiment is shown in FIG. 12, and components of this third embodiment which are similar to the first embodiment will be given like numerical designations, with a "b" suffix distinguishing those of the second embodiment. Thus, the apparatus 20b comprises the foot bath structure 22b with the four walls 24b–28b, and substantially the same liquid inlet section 50b as described in the first embodiment.

However, the third embodiment differs in two ways. First, the discharge section 54a has two discharge outlets 86b, each having its own control valve 88b. Further, the control section 98 of the first embodiment has been replaced with a microprocessor 132. This micro computer 132 is programmed to accomplish the same basic functions as described previously relative to the cycles of the apparatus 20, but other functions or sequence of operation could be initiated. Also, some of these added functions or features could be added to take advantage of the two outlet openings 86b.

With regard to the added or modified functions, one of these could proceed as follows. Instead of having the cycle start with the agitation phase, there would first be an initial draining phase, where one of the discharge openings 86b could be opened to drain the liquid presently in the liquid containing region 32b, but with the liquid inlet openings not operating. This would permit a more undisturbed outflow of this liquid (which comprises both the water with the chemicals therein) to a separate location, indicated schematically at 134. There could be at this location 134 a tank to collect this liquid separately.

Then, the cycle would proceed as indicated previously herein where there would be the agitation phase, the draining phase, and the flushing phase. During these three phases, the other discharge outlet 86b would be open so that a substantial portion of the manure and other waste material would be directed to another location. Water that is being used during the agitation phase and the subsequent flushing phase is fresh water, the manure and other debris which is flowing with this water into the other discharge opening 88b will be directed to another location, indicated schematically at 136. There may be some benefit in this arrangement in treating each of these discharge portions in a different manner, possibly for recycling in some manner, or subsequent treatment for environmental reasons, or possible economies in the operation in certain respects.

Further, the micro-processor 132 could be operated in a manner to initiate some portions of the cycle for sanitation purposes, and this could be done during periods where the apparatus 20 is not functioning in providing a disinfectant foot bath. For example, some manure and other material could be collecting in the liquid retaining region 32. This could happen if the cows are directed through the pathway in which the apparatus 20b is located. The agitation phase could be operated by itself, without any follow-up, and in this instance the water would be flowing through the inlet openings 58–62, the same as in the first embodiment, with the second discharge opening 86b being open. Alternatively, an agitation phase, a draining phase, and then a flushing phase can be accomplished without any chemical injection into the fresh water. In this manner, there may be a more effective cleaning of the liquid containing region 32.

It is obvious that various other modifications can be made in the present invention without departing from the basic teachings thereof. The claims of the invention are intended to cover not only the specific construction and function of the components and also steps in the method of the present invention, but also the equivalent components, designs, cycles, and steps or phases of these cycles.

I claim:

[1. An automated foot bath system for animals consisting of cows or other animals, said system comprising:

a) a foot bath structure having a front wall, a rear wall, two side walls and a floor, said foot bath structure defining a liquid containing region comprising a front containing area and a rear containing area, said foot bath structure being arranged to permit the animals to walk over the floor and through a foot bath liquid in the liquid containing region, b) a water inlet section arranged to supply water to said liquid containing region water, and to supply at least a portion of said water so as to be directed into said front water containing area and as high velocity jet flow to be able to cause a flow pattern in said liquid containing region of eddy current flow or turbulent flow, or a combination of eddy current flow and turbulent flow, with said high velocity jet flow being capable of moving waste material in said liquid containing region, c) a discharge section which is at the rear containing region and which has a closed configuration to contain liquid in said liquid containing region and an open configuration to discharge liquid from said liquid containing area, d) a chemical supply section to provide a quantity of a chemical component as an ingredient of a foot bath liquid for the liquid containing region, e) a control section arranged to i) cause said water inlet section to operate in a time frame to supply water to said liquid containing region to cause said high velocity jet flow to move waste material in said liquid containing region and to provide water as a constituent for foot bath water in said liquid, ii) to cause said discharge section to selectively move between the closed and open configuration to contain liquid or permit an outflow of liquid in the liquid containing region, and iii) to cause said chemical supply section to provide said quantity of said chemical component for said foot bath liquid.]

[2. The system as recited in claim 1, wherein said control section is arranged to operate in a cycle of operation through at least an agitation phase where said water inlet section supplies water as said high velocity jet flow to move waste material in said liquid containing region, and for at least part of the time that the high velocity jet flow is taking place, the discharge section is caused to be in its open configuration to enable liquid in the liquid containing region with waste material carried therein to be discharged from the liquid containing region.]

[3. The system as recited in claim 2, wherein there is in said cycle a draining phase where the flow of high velocity liquid jet flow is at least reduced or stopped by the control section, and said draining phase takes place where said outlet section is in its open configuration to enable remaining liquid in the liquid containing region to be discharged from the liquid containing region.]

[4. The system as recited in claim 3, wherein said control section operates so that said draining phase is followed by a flushing phase where the discharge section is in its open configuration, and the water inlet section is discharging water as said high velocity jet flow to cause further removal of waste material in the liquid containing region.]

[5. The system as recited in claim 2, wherein said cycle is arranged so that with foot bath liquid being already contained in said liquid containing region, and with said contained foot bath liquid being in condition to be removed from said liquid containing region, said agitation phase is initiated by said control section by causing the foot bath structure to discharge the water as said high velocity jet flow, and also to cause said discharge section to be in its open configuration, so that waste material in said liquid containing region is agitated to move waste material in the liquid containing region in a circulating pattern and break down at least some of said waste material into smaller particle size, with there being a net downstream flow from said inlet section to said discharge section.]

[6. The system as recited in claim 2, wherein the cycle further comprises a draining phase when the outlet section is in the open configuration and a fill and chemical injection phase in which subsequent to the agitation phase, and draining phase, said water inlet section discharges water into said liquid containing region and the quantity of the chemical component is injected as a chemical liquid into the water that is provided for the liquid containing region.]

[7. The system as recited in claim 6, wherein the water inlet section discharges at least a portion of the water into the liquid containing region to be mixed with the water in the liquid containing region in the flow pattern of the water.]

[8. The system as recited in claim 1, wherein said water inlet section is provided with at least first and second water inlet openings spaced laterally from one another to direct water as said high velocity jet flow into said liquid containing region.]

[9. The system as recited in claim 8, wherein said foot bath structure is arranged with the liquid containing region having a front to rear longitudinal center axis and a transverse axis, and said liquid containing region has a length dimension along said longitudinal axis greater than a width along said transverse axis, said two inlet openings of the water inlet section being positioned at the front wall of the foot bath structure, facing generally in a rearward direction toward the rear wall, and being spaced laterally from one another on opposite sides of said longitudinal center axis, so that the two inlet openings cause water streams to travel on opposite sides of said longitudinal axis and have a return flow path in an eddy current flow in a forward direction at a location closer to the longitudinal center axis.]

[10. The system as recited in claim 9, wherein said water inlet section has a third opening inlet which is positioned between said first and second liquid inlets and nearer to said longitudinal center axis, said third inlet opening directs a third flow of water in a generally longitudinally aligned direction.]

[11. The system as recited in claim 10, wherein said third inlet opening has a generally laterally aligned slot-like configuration arranged to discharge water in a laterally expanding pattern toward flow streams generated by said first and second high velocity jet flows from said first and second inlet openings.]

[12. The system as recited in claim 8, wherein there are at least two additional inlet openings of said water inlet section which discharge water in a high velocity jet flow mode into the liquid containing region.]

[13. The system as recited in claim 9, wherein said first and second inlet openings are located in, or adjacent to, said front wall of the foot bath structure, and said front wall has a transverse width dimension, said first and second inlet openings each being spaced from the longitudinal center axis, at least a quarter of a distance between the longitudinal center axis of said liquid containing region and an adjacent outer end portion of said front wall.]

[14. The system as recited in claim 13, wherein said first and second inlet openings are spaced from said longitudinal center axis at least approximately half the distance from the longitudinal center axis to the adjacent outer edge of the front wall.]

[15. The system as recited in claim 1, wherein said high velocity jet flow has a velocity of at least two feet per second.]

[16. The system as recited in claim 15, wherein said velocity is at least as great about four feet per second.]

[17. The system as recited in claim 1, wherein said control system comprises a clock component having operative connections to at least three components or combination of components that in turn provide timing for activation of the water inlet section, the discharge section and the chemical supply section to cause said water inlet section, said discharge section and said chemical supply section to operate in proper timed sequence.]

[18. The system as recited in claim 17, wherein said component or components control operation of said water inlet section to cause said water inlet section operate to discharge water in said high velocity flow mode during an agitating phase, and to cause said discharge section to be in its open configuration during the agitation phase, to cause the water inlet section to reduce or stop water flow in the high velocity jet flow mode during at least part of a draining phase where the discharge section is in its open configuration, and to return to operating in the high velocity flow mode for a flushing phase with the discharge section being in its open configuration.]

[19. The system as recited in claim 1, wherein said control section comprises a micro-computer to control operation of said water inlet section to cause said water inlet section operate to discharge water in said high velocity flow mode during an agitating phase, and to cause said discharge section to be in its open configuration during the agitation phase, to cause the water inlet section to reduce or stop water flow in a high velocity jet flow mode during at least part of a draining phase where the discharge section is in its open configuration, and to return to operating in the high velocity flow mode for a flushing phase with the discharge section being in its open configuration.]

*20. An automated foot bath device for animals having hooves, the device comprising:*

*a foot bath structure having a floor and a plurality of walls, the floor and the plurality of walls collectively defining a liquid containing region, one of the walls defining at least one liquid inlet opening, one of the walls defining at least one liquid chemical opening, one of the walls defining at least one outlet opening;*

*piping extending from the at least one liquid inlet opening to a supply of liquid;*

*a first valve in communication with the piping extending from the at least one liquid inlet opening to the supply of liquid to selectively allow the liquid to reach the liquid containing region through the at least one liquid inlet opening;*

*piping extending from the at least one liquid chemical opening to a supply of liquid chemical;*

*a first pump in communication with the supply of liquid chemical to selectively force the liquid chemical to reach the liquid containing region through the at least one liquid chemical opening;*

*a second valve in communication with the at least one outlet opening to selectively allow the waste in the liquid containing region to flow through the at least one outlet opening; and*

*a control box in communication with the first valve, the second valve, and the first pump for selectively actuating the first valve, the second valve, and the first pump, respectively; wherein the control box actuates the first valve, the second valve, and the first pump in accordance with at least five preselected phases;*

*wherein one preselected phase is an agitation phase in which:*

*the first valve allows the liquid to reach the liquid containing region;*

*the second valve allows flow through the at least one outlet opening; and*

*the first pump does not force the liquid chemical to reach the liquid containing region;*

*wherein another preselected phase is a drain phase in which:*

*the first valve does not allow more of the liquid to reach the liquid containing region;*

*the second valve allows flow through the at least one outlet opening; and*

*the first pump does not force more of the liquid chemical to reach the liquid containing region;*

*wherein still another preselected phase is a flush phase in which:*

*the first valve allows more of the liquid to reach the liquid containing region;*

*the second valve allows flow through the at least one outlet opening; and*

*the first pump does not force more of the liquid chemical to reach the liquid containing region;*

*wherein yet another preselected phase is a fill phase in which:*

*the first valve allows more of the liquid to reach the liquid containing region;*

*the second valve does not allow flow through the at least one outlet opening; and*

*the first pump forces more of the liquid chemical to reach the liquid containing region; and*

*wherein still yet another preselected phase is a bathing phase in which:*

*the first valve does not allow more of the liquid to reach the liquid containing region;*

*the second valve does not allow flow through the at least one outlet opening; and*

*the first pump does not force more of the liquid chemical to reach the liquid containing region.*

*21. The device of claim 20, wherein the wall defining at least one outlet opening is distinct from the wall defining at least one liquid inlet opening.*

*22. The device of claim 21, wherein the floor is angled to be higher at the wall defining at least one liquid inlet opening than at the wall defining at least one outlet opening.*

*23. The device of claim 20, wherein the wall defining at least one liquid inlet opening is distinct from the wall defining at least one liquid chemical opening.*

*24. The device of claim 20, wherein the wall defining at least one liquid inlet opening and the wall defining at least one liquid chemical opening is a single wall.*

*25. The device of claim 24, wherein at least one liquid inlet opening and at least one liquid chemical opening are a single opening.*

*26. The device of claim 20, wherein the wall defining at least one liquid inlet opening is opposed to the wall defining at least one outlet opening.*

*27. The device of claim 20, wherein:*

*two of the walls are opposed;*

*one of the opposed walls defines the at least one liquid inlet opening and the at least one liquid chemical opening; and*

*another of the opposed walls defines the at least one outlet opening.*

*28. The automated foot bath device of claim 20, wherein the liquid is water.*

*29. An automated foot bath device for animals having hooves, the device comprising:*

*a foot bath structure having a floor and a plurality of walls, the floor and the plurality of walls collectively defining a liquid containing region, one of the walls defining at least one liquid inlet opening, one of the walls defining at least one liquid chemical opening, one of the walls defining at least one outlet opening;*

*piping extending from the at least one liquid inlet opening to a supply of liquid;*

*a first valve in communication with the piping extending from the at least one liquid inlet opening to the supply of liquid to selectively allow the liquid to reach the liquid containing region through the at least one liquid inlet opening;*

*piping extending from the at least one liquid chemical opening to a supply of liquid chemical;*

*a first pump in communication with the supply of liquid chemical to selectively force the liquid chemical to reach the liquid containing region through the at least one liquid chemical opening;*

*a second valve in communication with the at least one outlet opening to selectively allow the waste in the liquid containing region to flow through the at least one outlet opening; and*

*a control in communication with the first valve, the second valve, and the first pump for selectively actuating the first valve, the second valve, and the first pump, respectively: wherein the control actuates the first valve, the second valve, and the first pump in accordance with at least three preselected phases;*

*wherein one preselected phase is an agitation phase in which:*

*the first valve allows the liquid to reach the liquid containing region;*

*the second valve allows flow through the at least one outlet opening; and*

*the first pump does not force the liquid chemical to reach the liquid containing region;*

*wherein another preselected phase is a drain phase in which:*

*the first valve does not allow more of the liquid to reach the liquid containing region;*

*the second valve allows flow through the at least one outlet opening; and*

*the first pump does not force more of the liquid chemical to reach the liquid containing region; and*

*wherein still another preselected phase is a flush phase in which:*

*the first valve allows more of the liquid to reach the liquid containing region;*

*the second valve allows flow through the at least one outlet opening; and*

*the first pump does not force more of the liquid chemical to reach the liquid containing region.*

*30. The automated foot bath device of claim 27, wherein:*

*the agitation phase precedes the drain phase; and*

*the drain phase precedes the flush phase.*

*31. The automated foot bath device of claim 20, wherein:*

*the agitation phase precedes the drain phase;*

*the drain phase precedes the flush phase;*

*the flush phase precedes the fill phase; and*

*the fill phase precedes the bathing phase.*

*32. The automated foot bath device of claim 20, wherein in the fill phase, the first valve allows the liquid to reach the liquid containing region before and at least partially while the first pump forces the liquid chemical to reach the liquid containing region.*

*33. The automated foot bath device of claim 20, wherein the liquid is water.*

*34. An automated foot bath device for animals having hooves, the device comprising:*

*a foot bath structure having a floor and a plurality of walls, the floor and the plurality of walls collectively defining a liquid containing region, one of the walls defining at least one liquid inlet opening, one of the walls defining at least one liquid chemical opening, one of the walls defining at least one outlet opening;*

*piping extending from the at least one liquid inlet opening to a supply of liquid;*

*a first valve in communication with the piping extending from the at least one liquid inlet opening to the supply of liquid to selectively allow the liquid to reach the liquid containing region through the at least one liquid inlet opening;*

*piping extending from the at least one liquid chemical opening to a supply of liquid chemical;*

*a first pump in communication with the supply of liquid chemical to selectively force the liquid chemical to reach the liquid containing region through the at least one liquid chemical opening;*

*a second valve in communication with the at least one outlet opening to selectively allow the waste in the liquid containing region to flow through the at least one outlet opening; and*

*a control in communication with the first valve, the second valve, and the first pump for selectively actuating the first valve, the second valve, and the first pump, respectively; wherein the control actuates the first valve, the second valve, and the first pump in accordance with at least three preselected phases;*

*wherein one preselected phase is an agitation phase in which:*

*the first valve allows the liquid to reach the liquid containing region;*

*the second valve allows flow through the at least one outlet opening; and*

*the first pump does not force the liquid chemical to reach the liquid containing region;*

*wherein another preselected phase is a drain phase in which:*

*the first valve does not allow more of the liquid to reach the liquid containing region;*

*the second valve allows flow through the at least one outlet opening; and*

*the first pump does not force more of the liquid chemical to reach the liquid containing region; and*

*wherein still another preselected phase is a flush phase in which:*

*the first valve allows more of the liquid to reach the liquid containing region;*

*the second valve allows flow through the at least one outlet opening; and*

*the first pump does not force more of the liquid chemical to reach the liquid containing region.*

*35. The automated foot bath device of claim 35, wherein:*

*the agitation phase precedes the drain phase; and*

*the drain phase precedes the flush phase.*

*36. The automated foot bath device of claim 35, wherein the liquid is water.*

* * * * *